July 19, 1966    A. E. BREED ETAL    3,261,151
CROP CHOPPER KNIFE
Filed April 23, 1964
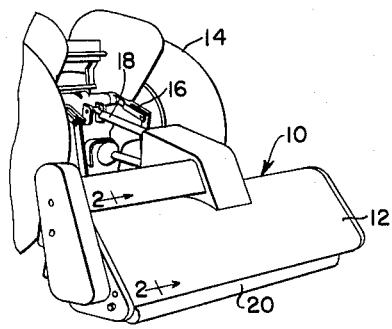
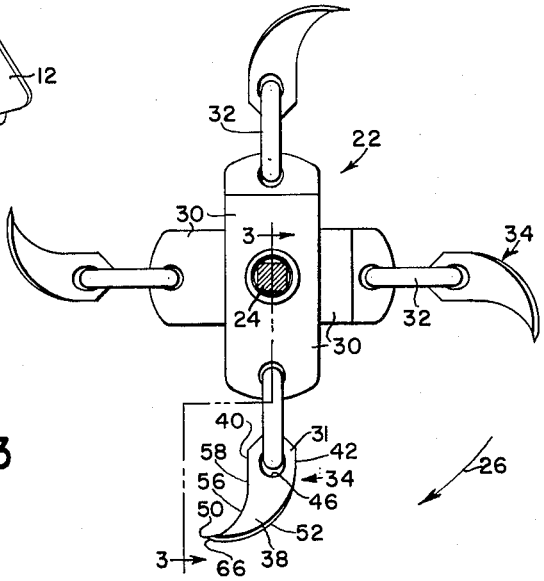
INVENTOR.
ARIE E. BREED &
GLENN L. MYERS United States Patent Office 3,261,151
Patented July 19, 1966

3,261,151
CROP CHOPPER KNIFE
Arie E. Breed and Glenn L. Myers, Ottumwa, Iowa, assignors to Deere & Company, Moline, Ill., a corporation of Delaware
Filed Apr. 23, 1964, Ser. No. 362,109
3 Claims. (Cl. 56—294)

This invention relates to a crop chopper knife of the type finding principal utility in forage harvesters, rotary mowers and like machines.

A machine of this character normally includes a rotor mounted on a transverse horizontal axis and including a plurality of knives or blades which stand out radially as the rotor rotates. Various types of knives have heretofore been designed and used but all of these have one or more shortcomings, principal among which are the inability to shed material, with the result that the rotor ultimately becomes clogged and must be stopped to be cleaned out.

According to the present invention, an improved rotor knife is provided, featuring a plate-like element having a narrow shank and a relatively wider shovel-like portion which terminates at a leading or front cutting edge. This edge is relatively wide so as to increase its cutting capacity and, on the other hand, the shank is relatively narrow so as to decrease its resistance to crops whereby crops will not "hairpin" thereon. The concave upper and forward surface of the shovel-like portion contributes to the ability of the knife to throw the crops into, say, a collector, as in the case of a chopper of the auger-blower type (e.g., U.S. Patent 2,871,643 to M. E. McClellan, dated February 3, 1949), the so-called direct-throw type (e.g. U.S. Patent 2,786,317 to V. J. Lundell, dated March 26, 1957) or the mower type in which the crop is returned back to the ground (e.g., U.S. Design Patent 189,107 to G. R. Sutherland, dated October 25, 1960).

It is a further object of the invention to provide the knife in the form of a one-piece element in which the shovel-like portion is a single-thickness part of the element and the shank is a double-thickness portion of the element.

Features and advantages in addition to those noted here will appear from the following detailed description of a preferred embodiment of the invention, illustrated and described by way of example, in the ensuing description and accompanying sheet of drawings, the figures of which are described below.

FIG. 1 is a fragmentary perspective rear view of a tractor-mounted crop chopper.

FIG. 2 is an enlarged end view, with portions shown in section, of the rotor as would be seen along the lines 2—2 of FIG. 1 were the enclosing structure omitted.

FIG. 3 is a fragmentary section as seen generally along the line 3—3 of FIG. 2.

FIG. 4 is a perspective of the knife as seen from the front and one side.

FIG. 5 is another perspective as seen from the rear and one side.

FIG. 6 is a bottom view of the knife.

The crop chopper chosen for purposes of illustration is generally like that shown in the above-noted design patent and is represented in its entirety by the numeral 10. This machine is of the tractor-connected and tractor-powered type and comprises essentially an outer hood srtucture 12 connected to the tractor 14 by hitch linkage 16 and driven by a propeller shaft 18 from the tractor power take-off shaft, all of which is generally conventional. The rear portion of the machine carries a transverse roller 20 which gauges the height of cut effected by a rotor, shown in FIG. 2 and designated in its entirety by the numeral 22.

This rotor may be mounted in any suitable fashion, not material here, within the hood 10 so as to rotate about the axis of a central shaft 24 to travel in the direction of the arrow 26, which is clockwise as viewed from the left-hand side of the machine when the machine is moving to the left of the sheet as seen in FIG. 1. This means that crops cut by the rotor will be severed at the height determined by the gauge roller 20 and, in this case, will be returned to the ground behind the machine as the machine advances, being of course confined by the hood 10 while being cut. A machine as shown in FIG. 1 is sometimes called a mower and sometimes a shredder. The principles of the invention are equally applicable and are also applicable to machines of the other type noted above.

The rotor shaft may carry thereon a plurality of spacers 28 which between them interspace a plurality of radial mounting plates 30 in sets of diametrically arranged pairs, each adjacent pair being at 90° to the neighboring pairs. By means of a link 32, each plate-like structure carries a knife 34. Since the knives are identical, only one will be described.

The knife is a steel plate-like element shaped symmetrically about its median plane. For purposes of description, the knife will be considered with respect to the position of the lowermost knife as shown in FIGS. 2 and 3 and further with respect to the posture of the knife as shown in FIGS. 4 and 5. Since the axis of the rotor shaft 24 is transverse to the line of travel, the median plane of the knife just referred to will be fore-and-aft.

The knife has a rear, upright, relatively transversely narrow shank 36 and a lower shovel-like part 38 integral with the shank and into which the shank merges forwardly and downwardly and laterally outwardly and downwardly. The shank has upright front and rear edges 40 and 42, respectively, and opposite upright fore-and-aft sides 44. The shank is apertured at 46 to provide a rotor-attachable portion receivable of the link 32 for connection to the associated rotor plates 30.

In the present case, the shank 36 is a double-thickness portion of the plate-like element, this construction being established by folding portions of the plate to establish the shank, thereby giving the front edge of the shank a relatively smoothly rounded surface formed substantially about an upright axis. In other words, the shank is a double-thickness part of said element and the lower part 38 is a single-thickness part of said element, and the components of the double-thickness part are substantially in contact with each other and being provided by folding the plate-like element along the leading edge of the shank.

This rounded surface is coextensive with a major portion of the length of the shank, the shank having an upper terminal end 48, shaped as shown to facilitate articulation thereof in the machine.

The shovel-like lower part 38 is bordered at its front or leading edge by a transverse, sharp, relatively wide cutting edge 50, which is offset a substantial amount ahead of the front edge 40 of the shank 36. The portion 38 is bounded at opposite sides by opposite side edges 52 which converge rearwardly and upwardly from opposite ends of the cutting edge to opposite lower portions of the shank rear edge, merging into the latter in the areas at 54 in the drawings.

The lower part 38 of the knife has a top, front surface extending between the cutting edge 50 and a lower portion of the shank 36. This surface is dished or concave about a transverse axis and faces upwardly and forwardly. In addition, the surface converges to the lower portion of the shank as best seen in FIG. 4, the surface itself being denoted by the numeral 56, the junction of the surface with the front edge 40 being indicated at 58, and the general areas of convergence of the sides of the surface being shown at 60. This will be further seen in the bottom view (FIG. 6), wherein the lines 62 represent, respectively, the underportions of the areas 60.

Because of the folded construction of the element which affords the shank 36 and the relatively wider shovel-like portion 38, lower side portions of the shank merge laterally outwardly respectively with lower rear portions of the part 38. In other words, each of the opposite sides 44 of the shank curves downwardly and outwardly to meet the associated side edge 52, the junction or merger being indicated by the numeral 64. Thus, the construction affords substantial rigidity in the double-thickness portion making up the shank and at the same time gives a relatively wide cutting edge, at 50, to increase the capacity of the knife. The smoothly flowing junctions of the surfaces presented to the crop prevent hairpinning and other accumulations of crop on the knife. The wide shovel-like surface 56 insures that the crop will be carried over as the rotor rotates, the concave surface at the same time assuring that the crop can depart from the knife by centrifugal force.

The knife is simply constructed, is relatively inexpensive to manufacture and performs the task for which it is designed.

The underportion of the cutting edge is beveled as indicated, at least a lower portion being beveled upwardly and forwardly at 66 to enable the knife to be resharpened from below without affecting the leading portion of the convace surface 56.

Features and advantages other than those enumerated will readily occur to those versed in the art, as will many modifications and alterations therein, all of which may be achieved without departure from the spirit and scope of the invention.

What is claimed is:

1. A crop chopper knife comprising a plate-like element shaped symmetrically at opposite sides of a fore-and-aft median plane and having a rear, upright, relatively transversely narrow shank and a lower shovel-like part integral with the shank and into which the shank smoothly merges forwardly and downwardly and laterally outwardly and downwardly, said shank having upright front and rear edges, a terminal upper end and opposite upright, fore-and-aft sides and said lower part having a transverse, relatively wide front cutting edge offset ahead of the shank front edge and opposite side edges converging rearwardly and upwardly from opposite ends of the cutting edge to opposite lower portions of the shank rear edge, said lower part having a top, front surface facing upwardly and forwardly and extending between the cutting edge and a lower portion of the shank and said surface further converging rearwardly and upwardly to and merging smoothly with said shank lower portion, said shank front edge narrowing thence from and above its said lower portion and being relatively smoothly rounded generally about an upright axis in said median plane, and said opposite sides of the shank in lower portions thereof curving concavely laterally outwardly and downwardly respectively to and merging smoothly with the opposite side edges of said shovel-like lower part, and said shank being a double-thickness part of said element and said lower part is a single-thickness part of said element, the components of said double-thickness part being substantially in contact with each other and being provided by folding the plate-like element along the leading edge of the shank.

2. The invention defined in claim 1, in which, the underportion of the cutting edge is beveled upwardly and forwardly to place said cutting edge at a level above said underportion.

3. The invention defined in claim 1, in which: said top, front surface is substantially concave generally about a transverse axis.

References Cited by the Examiner
UNITED STATES PATENTS
3,043,078 7/1962 Witt et al. _____ 56—289

FOREIGN PATENTS
846,117 8/1960 Great Britain.

ANTONIO F. GUIDA, *Acting Primary Examiner.*

A. G. STONE, *Assistant Examiner.*